United States Patent
Faseler et al.

(10) Patent No.: US 12,326,348 B2
(45) Date of Patent: Jun. 10, 2025

(54) INSTRUMENT ENCLOSURE

(71) Applicants: Brad Faseler, Houston, TX (US);
Daniel Tagtow, Austin, TX (US);
James Bundschuh, Fenton, MO (US);
Matthew Nance, Boling, TX (US)

(72) Inventors: Brad Faseler, Houston, TX (US);
Daniel Tagtow, Austin, TX (US);
James Bundschuh, Fenton, MO (US);
Matthew Nance, Boling, TX (US)

(73) Assignees: Terrapin Industrial, LLC, Houston, TX (US); Brad Faseler, Houston, TX (US)

(*) Notice: Subject to any disclaimer, the term of this patent is extended or adjusted under 35 U.S.C. 154(b) by 308 days.

(21) Appl. No.: 18/046,285

(22) Filed: Oct. 13, 2022

(65) Prior Publication Data

US 2023/0141547 A1    May 11, 2023

Related U.S. Application Data

(63) Continuation-in-part of application No. 16/928,929, filed on Jul. 14, 2020, now abandoned, which is a
(Continued)

(51) Int. Cl.
*G01D 11/24*    (2006.01)
*G01D 11/26*    (2006.01)
(Continued)

(52) U.S. Cl.
CPC ......... *G01D 11/245* (2013.01); *G01D 11/26* (2013.01); *G01D 11/30* (2013.01); *G01L 19/142* (2013.01); *G01L 19/143* (2013.01)

(58) Field of Classification Search
CPC ...... G01D 11/24; G01D 11/245; G01D 11/30; G01L 19/142; G01L 19/143; G01R 1/04
(Continued)

(56) References Cited

U.S. PATENT DOCUMENTS 3,731,534 A    5/1973    Painley
4,033,191 A    7/1977    Kruez et al.
(Continued)

OTHER PUBLICATIONS

Alpert, E., International Search Report. Israel Patent Office. ISA/ILPO. Form PCT/ISA/210. Box A-C. Dec. 28, 2023, Jerusalem, Israel.
(Continued)

*Primary Examiner* — Benjamin R Schmitt
(74) *Attorney, Agent, or Firm* — ePatentManager.com; Guerry L. Grune (57) ABSTRACT

An instrument enclosure includes top and bottom sections, the bottom section having a first part fastened to a second part, and hinges hinging the top and bottom sections to enable the top section to rotate between a close positioned and an open position. When closed, the instrument enclosure defines an enclosed space suitable for receiving a field instrument. The bottom section may be fastened to a standpipe or to a bracket fastened to the standpipe. The bottom section may define an opening configured to receive the standpipe and/or an opening to receive process line tubing carrying process line signals to the field instrument. The field instrument may be affixed to an end portion of the standpipe received in the enclosed space, removably attached to an interior of the instrument enclosure, or affixed to a mounting plate attached to the standing pipe.

18 Claims, 6 Drawing Sheets

Related U.S. Application Data continuation of application No. 15/920,128, filed on Mar. 13, 2018, now Pat. No. 10,712,181.

(60) Provisional application No. 62/481,680, filed on Apr. 4, 2017.

(51) Int. Cl.
*G01D 11/30* (2006.01)
*G01L 19/14* (2006.01)

(58) Field of Classification Search
USPC .................. 73/431, 756; 220/4.01, 4.02, 475
See application file for complete search history.

(56) References Cited

U.S. PATENT DOCUMENTS

| | | | |
|---|---|---|---|
| 4,080,527 A | 3/1978 | Volling | |
| 4,135,688 A | 1/1979 | England | |
| 4,219,773 A | 8/1980 | Markfleet | |
| 4,249,227 A | 2/1981 | Kato | |
| 4,315,432 A | 2/1982 | Newton | |
| 4,392,539 A | 7/1983 | Fujii et al. | |
| 4,401,941 A | 8/1983 | Cunningham et al. | |
| 4,472,680 A | 9/1984 | Wellington | |
| 4,553,433 A | 11/1985 | Hicks | |
| 4,597,291 A | 7/1986 | Motomiya | |
| 4,869,105 A | 9/1989 | Hartmann et al. | |
| 4,920,799 A | 5/1990 | Low | |
| 5,115,263 A | 5/1992 | Bernhardt et al. | |
| 5,214,245 A | 5/1993 | Bernhardt et al. | |
| 5,426,562 A | 6/1995 | Morehouse et al. | |
| 5,471,666 A | 11/1995 | Sugiyama et al. | |
| 5,531,130 A | 7/1996 | Welker | |
| 5,547,095 A | 8/1996 | Sonntag et al. | |
| 5,641,086 A | 6/1997 | Sonntag et al. | |
| 5,646,823 A | 7/1997 | Amori | |
| 5,750,924 A | 5/1998 | Sonntag et al. | |
| 5,913,447 A | 6/1999 | Carpenter | |
| 6,231,819 B1 | 5/2001 | Morello | |
| 6,469,626 B1 | 10/2002 | Hung | |
| 6,921,141 B1 | 7/2005 | Porco | |
| 8,482,906 B2 | 7/2013 | Farley, Jr. et al. | |
| 10,712,181 B2 | 7/2020 | Faseler | |
| 2001/0011125 A1 | 8/2001 | Huse | |
| 2002/0109978 A1 | 8/2002 | Henry | |
| 2004/0042192 A1 | 3/2004 | Davidson et al. | |
| 2006/0176653 A1 | 8/2006 | Davidson et al. | |
| 2008/0165544 A1 | 7/2008 | Lazarus et al. | |
| 2009/0187356 A1 | 7/2009 | Artiuch | |
| 2011/0168716 A1 | 7/2011 | Stransky et al. | |
| 2012/0265491 A1 | 10/2012 | Drummy | |
| 2012/0325694 A1 | 12/2012 | Thompson | |
| 2015/0133979 A1 | 5/2015 | Johnson | |
| 2016/0150669 A1 | 5/2016 | Weber | |
| 2017/0074691 A1 | 3/2017 | Baird et al. | |
| 2018/0100778 A1* | 4/2018 | Gross | G01L 19/0609 |
| 2018/0283910 A1 | 10/2018 | Faseler | |
| 2021/0278269 A1 | 9/2021 | Artiuch et al. | |

OTHER PUBLICATIONS

Alpert, E., Written Opinion of the International Searching Authority. Israel Patent Office.. ISA/ILPO. Form PCT/IS/237, Dec. 28, 2023, Jerusalem, Israel.

* cited by examiner

INSTRUMENT ENCLOSURE

PRIORITY

This application is a continuation-in-part of and claims priority to U.S. Nonprovisional application Ser. No. 16/928,929 filed Jul. 14, 2020, which is a continuation of Ser. No. 15/920,128 filed Mar. 13, 2018, and granted as U.S. Pat. No. 10,712,181 on Jul. 14, 2020, which is a nonprovisional conversion of and claims priority to U.S. provisional application No. 62/481,680, filed Apr. 4, 2017, the entirety of which are incorporated by reference herein.

BACKGROUND

In fields of endeavor pertaining to petrochemical plants, refining facilities, upstream production of oil and gas, power plant generation, and other applicable fields, instruments are frequently employed to monitor or sense pressure, flow, temperature, and other process parameters. Frequently, such instruments are required and/or configured to operate out of doors, often in remote or otherwise isolated locations and these instruments may be referred to herein as field instruments. Instrument enclosures may be used to protect instruments, including field instruments.

Conventional instrument enclosures include standard-sized rigid enclosures and customized, removable, soft cover enclosures. Conventional rigid enclosures are not generally suitable for enclosing field instruments that are directly attached to a standpipe or the like. When a field instrument is to be enclosed with a conventional rigid enclosure, the field instrument is first affixed within the instrument enclosure and the enclosure, rather than the field instrument, is attached to the standpipe. Many mounting brackets may be required to arrange the instrument into the rigid box in such a way that allows the instrument enclosure to be opened and closed.

Soft removable covers, often used in warmer climates to wrap around mounted instruments, tubing or tubing bundles, and power and communication wiring, are often closed using either metal rings or extended straps of fabric from the cover itself, which in turn are typically equipped with Velcro. The metal rings may be used to run the strap through the ring and back to a matching Velcro section to secure the strap. To install a soft removable cover, a custom installer is generally required to go to a site, where the installer may have to be escorted from instrument to instrument and build a custom template to accommodate the instrument body, the manifold to which it is mounted, any necessary holes for both tubing or tubing bundle carrying the process fluid to the instrument, and any power or communication wiring. Due to their high degree of customization, these soft removable covers are often extremely difficult to re-install properly once removed for maintenance or any other reason. As a result, once they are removed from the instrument, these soft removable covers with one-of enclosure mechanisms are frequently not re-installed at all, or are not re-installed correctly, leaving the instrument exposed to the ambient conditions.

SUMMARY

Disclosed instrument enclosures address problems that may arise with typical rigid or soft cover enclosures. Disclosed instrument enclosures allow for a field instrument that is mounted directly to a standing structure, such as a conventional 2" standpipe or the like, to be enclosed, in the field, within an enclosed space defined by the instrument enclosure, thereby beneficially enabling contractors to improve their productivity during original installation and eliminate the practice of providing expensive and often proprietary instruments to a box manufacturer and then waiting for the assembled instrument and instrument enclosure assemblies to arrive back at the site to then be installed. Disclosed instrument enclosures save time during original installation because disclosed instrument enclosures do not require mounting all components and the field instrument to the instrument enclosure and then mounting the instrument enclosure on the standpipe or other structure. Disclosed instrument enclosures may be replaced without taking the field instrument offline and the time required to replace disclosed instrument enclosures is much less than time required to replace conventional rigid enclosures.

With respect to soft removable cover enclosures, disclosed instrument enclosures provide at least the following advantages: Disclosed instrument enclosures can be mounted directly to a supporting structure, like the field instrument itself, and will allow direct access to the field instrument without having to completely remove a custom fitted cover. Disclosed instrument enclosures are more likely to be replaced properly should a replacement be required whereas the soft removable covers are difficult to re-install properly once they have been removed from the field instrument, due to their custom fitted profiles. Disclosed instrument enclosures may reduce or eliminate expensive travel and the tedious process of walking around the applicable facility to first locate each instrument and then creating a custom template. Disclosed instrument enclosures can also be used for covering inline instruments, valves, regulators, and other appurtenances that would need to maintain a specified thermal profile.

Disclosed field-mounted instrument enclosures, including rigid and semi-rigid enclosures, protect field instruments from ambient conditions by providing a barrier between the enclosed space and the environment external to the enclosed space. The barrier shields the enclosed space from one or more environmental elements including, as non-limiting examples and depending on the embodiment, precipitation, humidity, wind, sunlight, environmental debris, wild animals, and unauthorized persons. Embodiments may employ seals, gaskets, or the like using known materials such as silicon or silicon-based compounds to improve the moisture barrier provided by the instrument enclosure in the closed position. Embodiments allow a universally sized box to completely enclose a field instrument without taking the field instrument off-line, removing the field instrument from a standpipe mount, or mounting the field instrument within an instrument enclosure using various brackets.

Disclosed instrument enclosures may include a top section, also sometimes referred to herein as a hinged section, and a bottom section, also referred to herein as a fixed section. The bottom section may include two parts, which may be hinged or affixed in a manner that permits the bottom to be opened and wrapped around a field instrument or other object mounted to a pipe or a standpipe. The two parts of the bottom section may be configured to wrap around a portion of the standpipe or other support, a portion of the tubing or tubing bundle carrying a process fluid, and a portion of any power wire(s) and/or communication wire(s) fixed to the field instrument.

Disclosed instrument enclosures may further include a hinge or fastening means which is suitable for attaching the top section of the instrument enclosure to the bottom section once the bottom section is in place.

Accordingly, subject matter disclosed herein includes an instrument enclosure comprising a top section, a bottom section including a first part and a second part, one or more fasteners for fastening the first part to the second part, and one or more hinges configured to hinge the top section to the bottom section. The bottom section may be suitably configured to readily attach directly to a standpipe or directly to a bracket that is affixed to the standpipe. In at least one embodiment, the hinges enable the top section to rotate, relative to the bottom section, wherein an angle formed by an edge of the top section and a corresponding edge of the section varies between 0 degrees in the closed position and N degrees in the open position where N can vary between 90 to 270 in some embodiments and N can vary between two different angles in other embodiments. In the closed position, edges of the top section are in contact with or in very close proximity to corresponding edges of the bottom section, and the combination of the top section and the bottom section define an enclosed space that is suitable for receiving a field instrument.

The first part of the bottom section may define a first notch and the second part of the bottom section may define a second notch. The first notch and the second notch may be positioned and sized wherein the combination of the first notch and the second notch define an opening in the bottom section when the first part is fastened to the second part. The opening in the bottom section may comprise an opening in a central portion of a base plate formed by the combination of a base portion of the first part and a base portion of the second part. The opening in the bottom section may be sized and otherwise configured to engage a standpipe, in which case an end portion of the standpipe may reside within the enclosed space defined by the top and bottom sections of the instrument enclosure in the closed position. In these embodiments, the field instrument, when installed, may be affixed to the end portion of the standpipe and the enclosed space is suitably sized to receive the field instrument affixed to the end portion of the standpipe.

One or more interior surfaces of enclosed space defined by the instrument enclosure, including but not limited to one or more interior surfaces of the bottom section, may include one or more instrument attachment elements or features to which one or more attachment elements or features of the field instrument may attach. In at least some embodiments, the attachment elements may be sufficient in number, position, strength, and other relevant parameters to fully support the field instrument. In such embodiments, the standpipe may terminate outside of the instrument enclosure and the enclosed space may not need to accommodate an end portion of the standpipe. In these embodiments, the instrument enclosure may be configured to attach to a mounting plate, bracket, or other suitable structure that is itself, affixed to the standpipe.

In some embodiments, one or more openings in the bottom section may be configured to receive one or more process line conduits for carrying, communicating, or otherwise conveying one or more measurable process parameters to the field instrument.

Such conduits may be enclosed in suitable process line tubing. In still other embodiments, the instrument enclosure may include a first opening configured to receive a standpipe and a second opening configured to receive one or more process line conduits and, in these embodiments, the standpipe opening may be located in a different surface of the instrument enclosure.

As a non-limiting example, the standpipe opening may be disposed in a horizontally oriented lower surface while the conduit opening is disposed in a vertically oriented reward surface of the instrument enclosure.

In embodiments of the instrument enclosure that include a first opening for a standpipe and a second opening for one or more process line conduits, the first part of the bottom section may include or define a first pipe notch and a first line notch while the second part of the bottom section may include or define a second pipe notch and a second line notch. In these embodiments, the first pipe notch and the second pipe notch may be positioned, sized, and otherwise configured wherein the combination of the first pipe notch and the second pipe notch define the standpipe opening when the first part and the second part are properly fastened together while the first line notch and the second line notch are positioned, sized, and otherwise configured wherein the combination of the first line notch and the second line notch define the process line opening when the first part and the second part are properly fastened together.

In some instrument enclosure embodiments, including embodiments that lack a pipe opening, the bottom section may be configured to be fastened to a mounting plate or bracket that is affixed or that is readily affixed to the standpipe.

In such embodiments, the mounting plate or bracket may include a plurality of openings suitable for receiving bolt, screws, pins, or other suitable fasteners, in which case, the bottom section of the instrument enclosure may include a corresponding plurality of openings for receiving said bolts, screws, pins, or other suitable fasteners.

In some embodiments, the instrument enclosure is a convex polyhedral instrument enclosure comprising a plurality of planar or substantially planar surfaces or walls. Convex polyhedral embodiments of the instrument enclosure may include hexahedral embodiments, comprising six planar surfaces including an upper surface and a lower surface that are oriented in parallel or substantially parallel planes, a forward surface and a rearward surface that are oriented in parallel or substantially parallel planes that are perpendicular or substantially perpendicular to the upper surface, and a left surface and a right surface that are oriented in parallel or substantially parallel planes that are perpendicular or substantially perpendicular to the upper surface and the forward surface.

In some hexahedral embodiments, the top section of the instrument enclosure includes the upper surface, the forward surface, a first portion of the left surface, and a first portion of the right surface while the bottom section includes the lower surface, the rearward surface, a second portion of the left surface and a second portion of the right surface. In these embodiments, the first part of the bottom section may include a first portion of the lower surface, a first portion of the rearward surface, and the second portion of the left surface while the second part of the bottom section may include a second portion of the lower surface, a second portion of the rearward surface, and the second portion of the right surface.

The first and second parts of the bottom section may be configured as mirror images of one another or substantially so. The first portion of the lower surface may comprise a first half of the lower surface while the second portion of the lower surface may comprise a second half of the lower surface. Similarly, the first portion of the rearward surface may comprise a first half of the rearward surface and the second portion of the rearward surface may comprise a second half of the rearward surface.

Embodiments of the instrument enclosure, including embodiments of hexahedral and other convex polyhedral instrument enclosures may include one or more durable and transparent or partially transparent windows of tempered glass or other suitable material.

In further accordance with disclosed subject matter, a disclosed method of providing an instrument enclosure suitable for enclosing a field instrument located at a desired site includes hinging a top section, also referred to herein as the hinged section, of an instrument enclosure to a bottom section, also referred to herein as the standing section, of the instrument enclosure to enable the hinged section to rotate, relative to the standing section, between a closed position and one or more open positions. When the instrument enclosure is in the closed position, the combination of the standing section and the hinged section define an enclosed space that is suitably dimensioned to receive a field instrument and suitably constructed to provide a barrier between the enclosed space and the external environment in which the instrument enclosure is located. The barrier shields the enclosed space from one or more environmental elements.

The method further includes attaching the standing second to a standing structure located at or within the site and affixing the field instrument to a supporting structure such that the field instrument is positioned in a particular position disposed within the enclosed space when the instrument enclosure is closed. The supporting structure may be the standpipe or attachment elements disposed in or on an interior surface of the enclosed space defined by the instrument enclosure in the closed position.

Embodiments of the method support substantially any sequence for hinging the hinged section, attaching the fixed section, and affixing the field instrument to a supporting structure, such that any of the following sequences may be followed: hinging, attaching, and supporting; attaching, hinging, and supporting; supporting, hinging, and attaching; and supporting, attaching, and hinging.

The method may further include forming the fixed section by fastening a first part of the fixed section to a second part of the hinged section. Affixing the field instrument to the supporting structure may include affixing the field instrument to the standing structure, in which case the instrument enclosure may include or define an aperture sized, positioned, and otherwise configured to receive a terminal portion of the standing structure within the enclosed space. Affixing the field instrument may alternatively include attaching the field instrument to one or more attachment features of the instrument enclosure, in which case the fixed portion of the instrument enclosure may be affixed to the standpipe or to a brace, bracket, or mounting plate attached to the standpipe.

The figures and corresponding text disclose non-limiting examples and embodiments. Reference numerals used in different figures represent similar structures or procedures unless denoted otherwise. Features shown may be enlarged or reduced relative to other features for clarity or emphasis to ensure better understanding.

DETAILED DESCRIPTION

Figure 1:
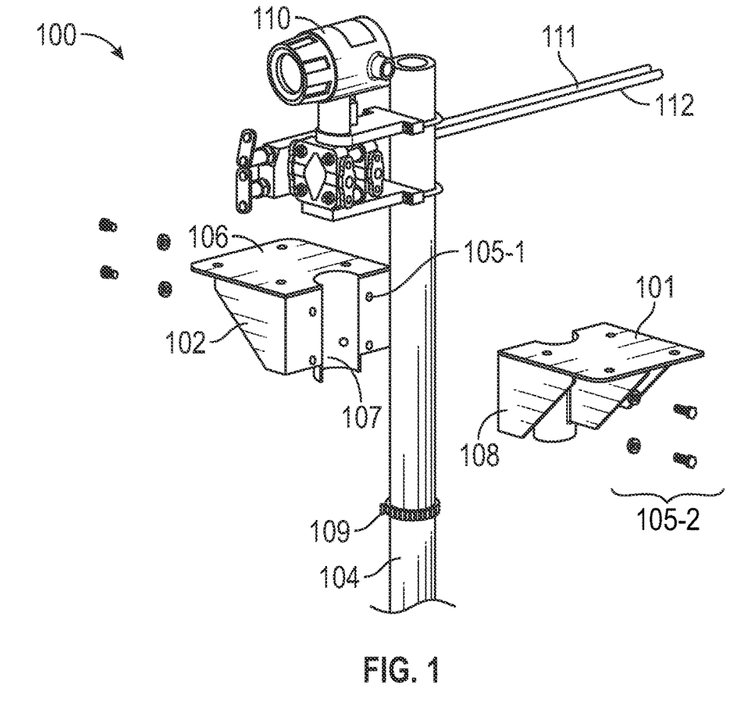
FIG. 1 provides an exploded view of the mounting plate affixed to a standpipe or other suitable standing structure onto which the instrument enclosure mounts.
Figure 2:
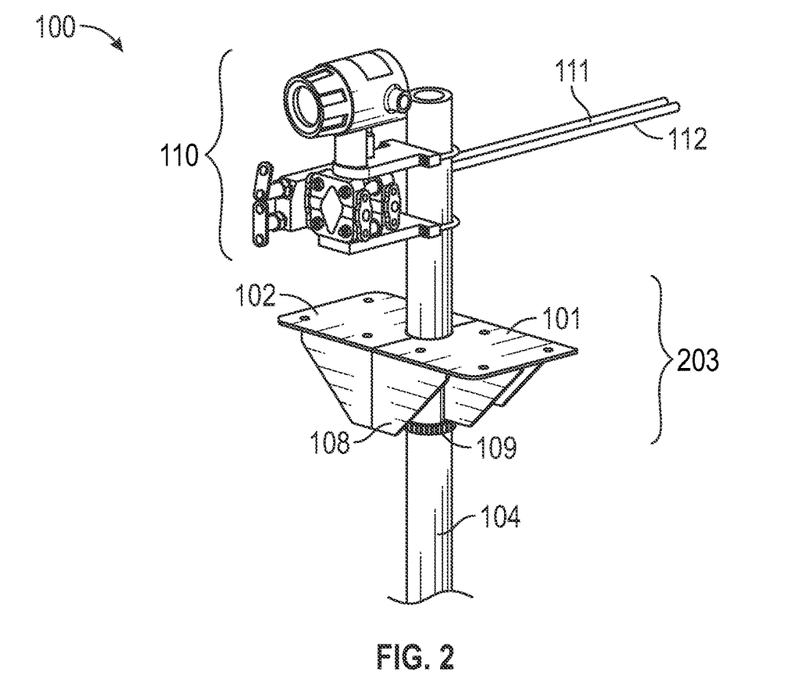
FIG. 2 provides a completed attachment of the mounting plate affixed to a standpipe or other suitable standing structure.

As illustrated in FIG. 1 and FIG. 2, instrument enclosure [100] includes left and right mounting plate sections [101, 102] which when joined create the mounting plate [203, shown completed in FIG. 2] affixed to a standpipe [104] or other suitable standing structure onto which the instrument enclosure [100] mounts. The mounting plate sections [101, 102] may be made of metal or other suitable material(s). The mounting plate sections [101, 102] are joined by aligned apertures [105-1] using suitable fastening means [105-2], such as nuts and bolts. The left and right mounting plate sections [101, 102] are identical, both having a planar top surface [106], arched recess [107] to receive a cylindrical standpipe [104], and fixed triangular supports [108]. A clamp [109] supports the mounting plate [203] and prevents vertical movement of the instrument enclosure [100].

A field instrument [110] can be directly mounted, affixed, or otherwise attached to the standpipe [104] or other suitable standing structure that limits contact of the instrument with the instrument enclosure [100]. The mounting plate [203] provides support to the instrument enclosure [100] separately and apart from the support of the field instrument [110].

In addition, the illustrated field instrument [110] is attached to process line tubing [111,112] configured to provide a process flow, as well as measurable parameters, to the field instrument [110]. The illustrated instrument enclosure assembly [100] includes a rigid or semi-rigid instrument enclosure [100] configured to be attached to standpipe [104] or mounting plate [203] such that the instrument enclosure [100] encompasses field instrument [110] while permitting ingress/egress for the process line tubing [111, 112].

In one embodiment, field instruments [110] having similar operating requirements can be used in tandem allowing more than one field instrument [110] to be included within the instrument enclosure [100].

In a further embodiment, the arched recess [107] can be provided in any suitable shape that can accommodate a suitable standing structure other than a standpipe [104] having a cylindrical shape. These recesses [107] may be shaped in accordance with the shape of the standpipe [104]. For the circular embodiment of the standpipe [104] presented, each recess [107] may define a semicircular arc.

Figure 3:
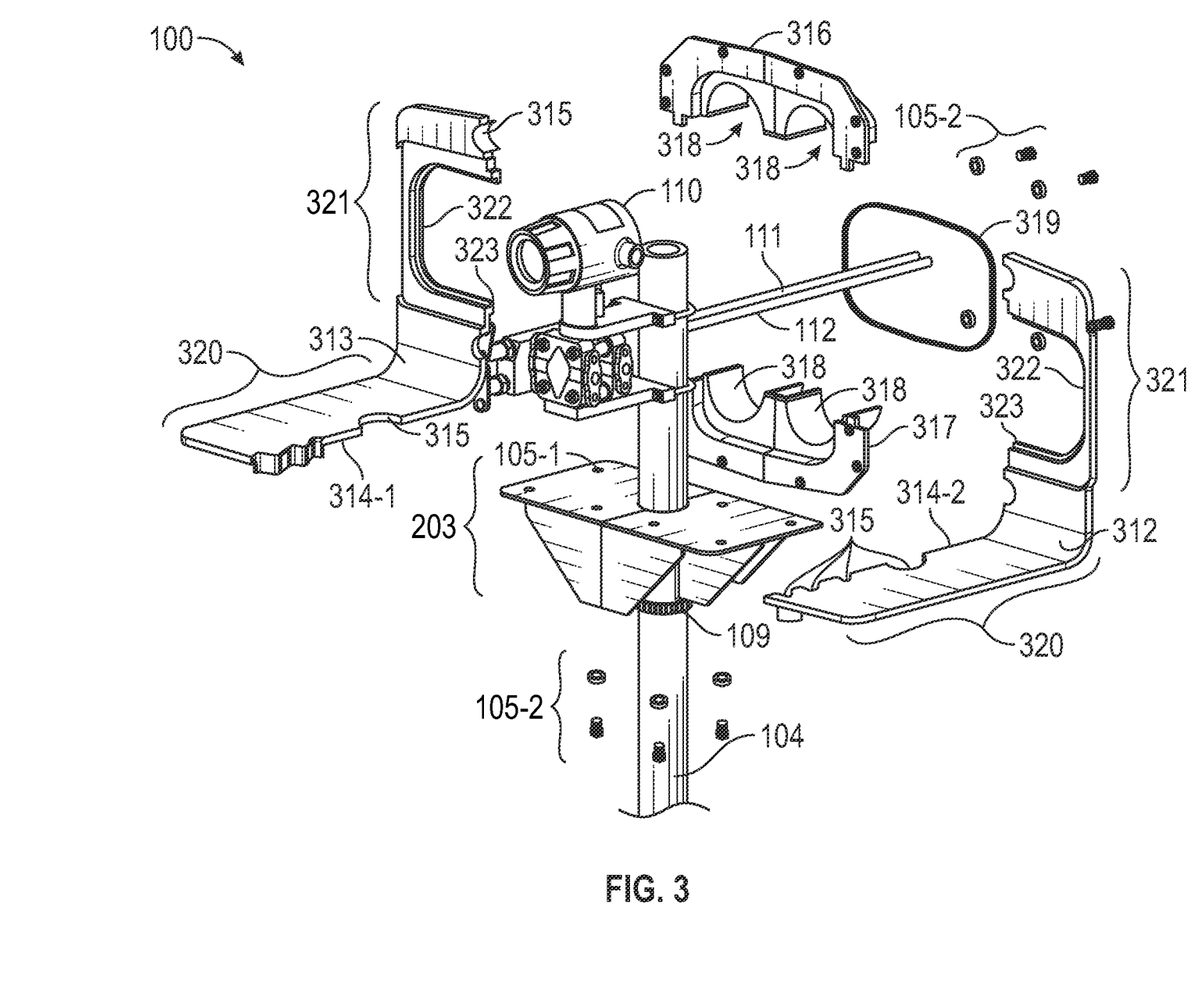
FIG. 3 provides an exploded isometric view of the bottom portion of an instrument enclosure during assembly from a top side perspective.
Figure 4:
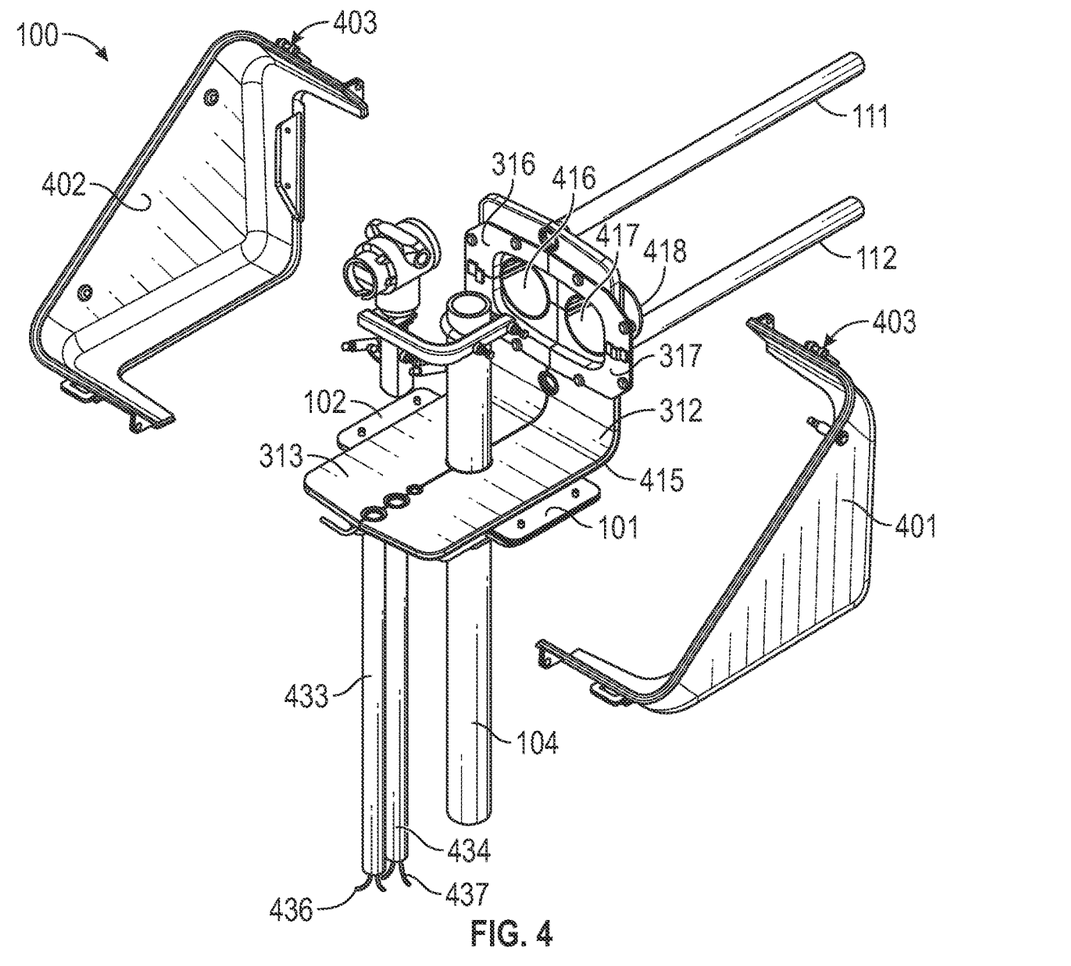
FIG. 4 provides a partially exploded isometric view of an instrument enclosure assembly from a top side perspective.
Figure 5:
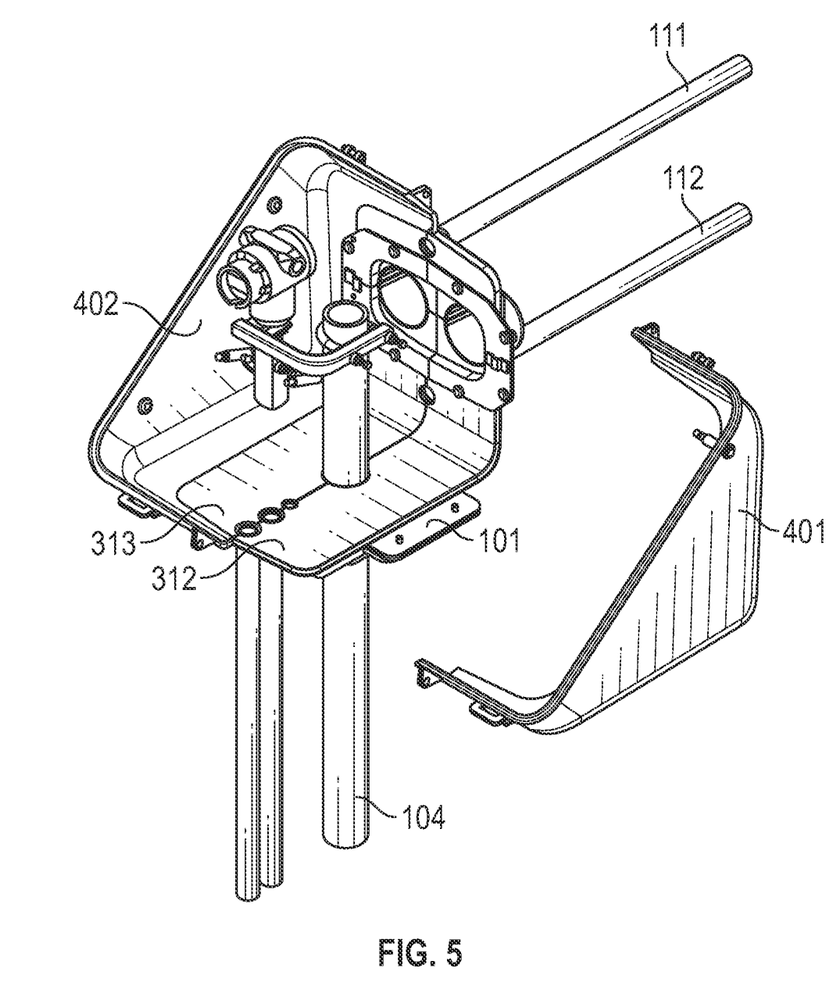
FIG. 5 illustrates a partial bottom assembly of the instrument enclosure.
Figure 6:
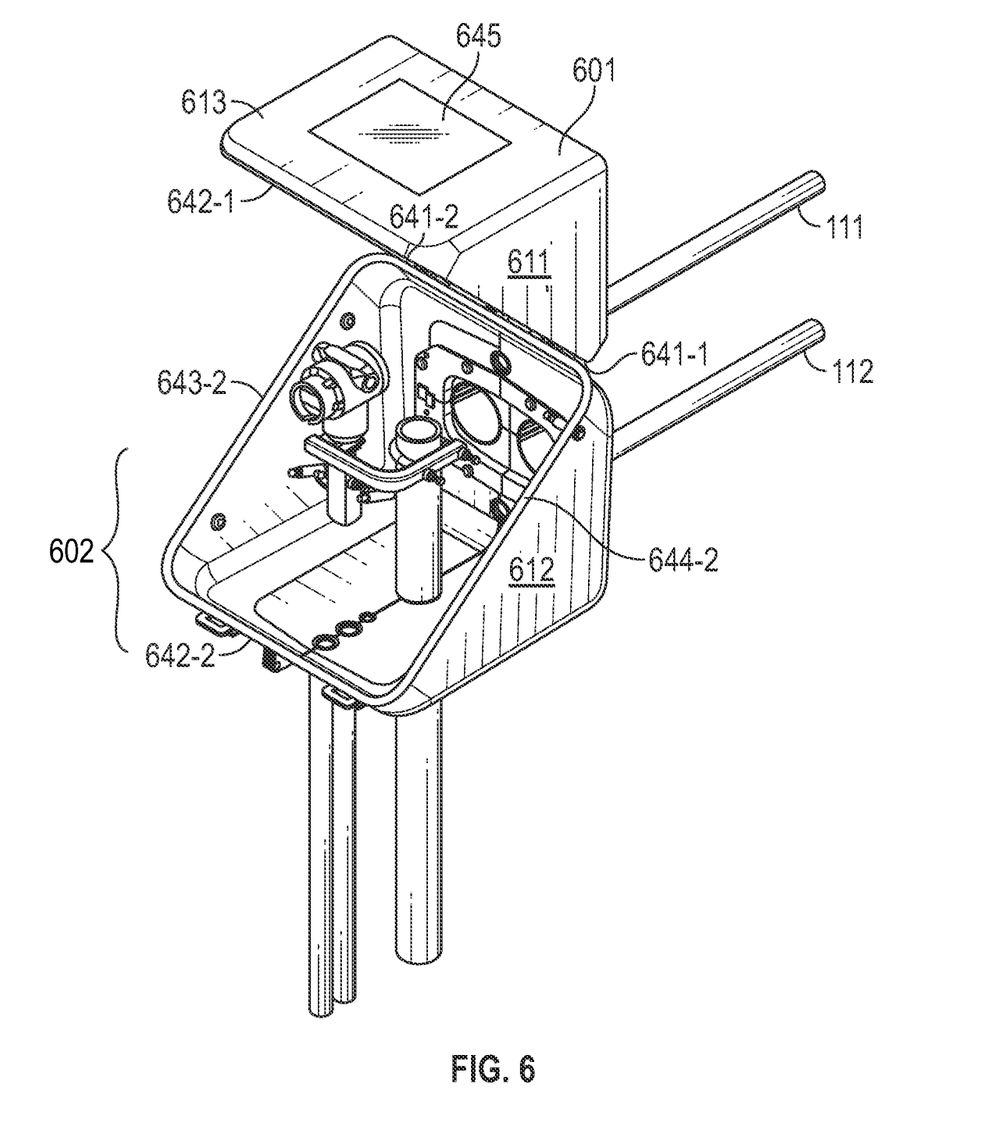
FIG. 6 illustrates a complete bottom assembly of the instrument enclosure in which the instrument enclosure is attached to a mounting plate affixed to a standpipe or other suitable standing structure.

The field instrument [110] can be attached to the standpipe [104] using a single attachment as shown in FIG. 4, FIG. 5, and FIG. 6, or a double attachment as shown in FIG. 1, FIG. 2, and FIG. 3.

Figure 7:
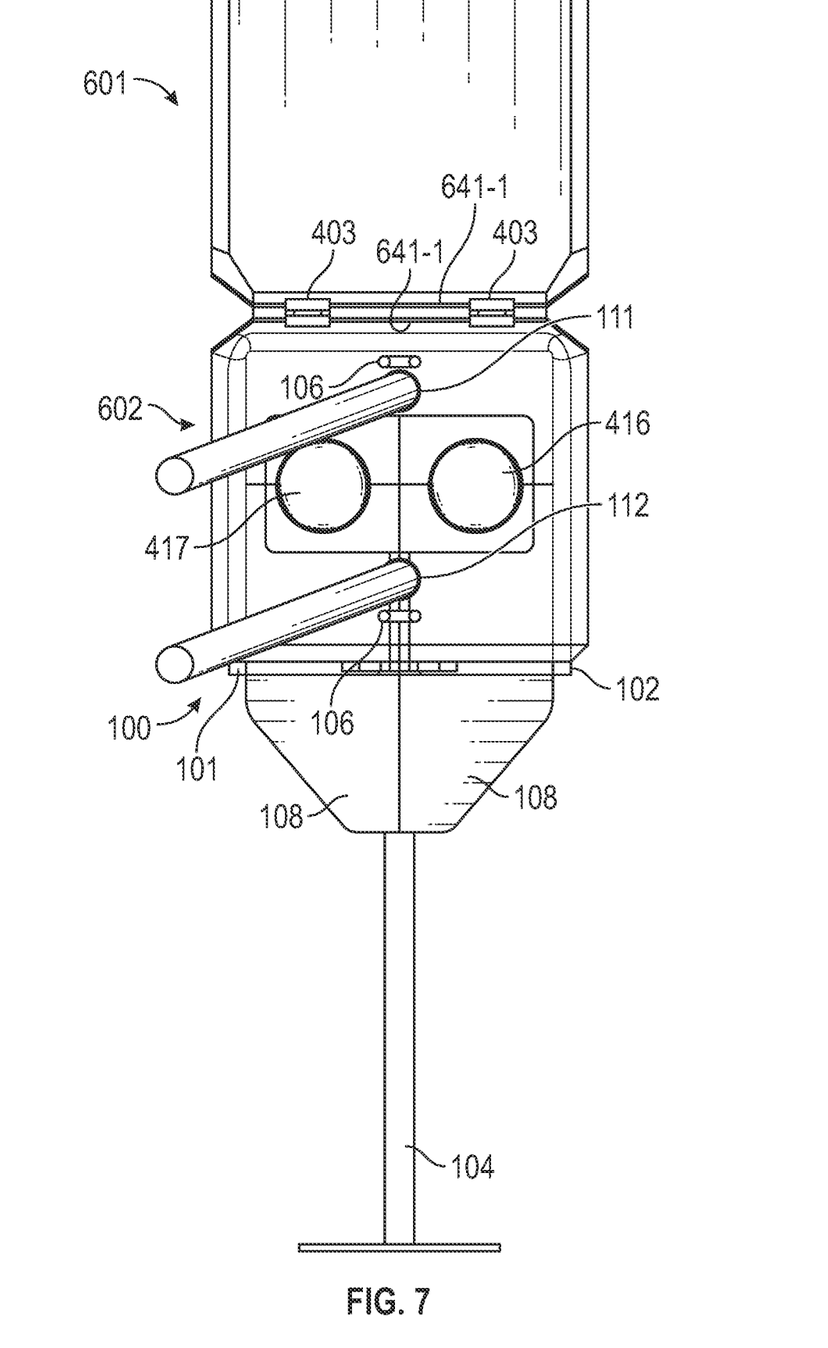
FIG. 7 illustrates a rear view of the instrument enclosure in a closed configuration.

FIG. 3 illustrates the inner assembly of the lower portion of an instrument enclosure [100]. The left and right bottom base sections [312,313] are mirror images and therefore are arranged in a reverse configuration when compared to the other. The left bottom base section [312] is distinct and detachable from the right bottom base section [313]. The bottom base sections [312,313] are connected together along respective L-shaped edges [314-1, 314-2] forming the bottom base [415] (shown completed in FIG. 4). Hinges [403] (shown in FIG. 4) or other suitable attachments can be provided. Hinges [403] may enable top casing [601, shown in FIG. 6] to rotate between an open position as best shown in FIG. 6 and a closed position (shown in FIG. 7).

The bottom base sections [312,313] may be connected by one or more fasteners 105-2, which may be implemented as hinged fasteners or as any other suitable type of rigid fastener. The bottom base sections [312,313] are joined atop the mounting plate [203] where a portion of the left and right mounting plate sections [101,102] are left accessible under the bottom base [415], as shown in FIG. 4, for the mounting of the left and right bottom casing segments [401,402]. FIG. 5 illustrates the attachment of the right bottom casing segment [402] to the right bottom base section [313].

Each bottom base section [312,313] includes a lower planar portion [320] and an upper planar portion [321] that is perpendicular or substantially perpendicular to the lower planar portion [320].

As illustrated in the figures, the lower planar portions [320] of the bottom base sections [312, 313] are oriented in a substantially horizontal plane while the perpendicular upper planar portions [321] of the bottom base sections [312,313] are oriented in a substantially vertical plane. Each lower planar portion [320] may include or define a recess [107] configured to engage standpipe [104] such that the two bottom base sections [312,313] may be attached to one another while engaging the standpipe [104].

Each upper planar portion [321] may include or define a lipped recess [322] having a lip [323] configured to engage the top [316] and bottom portal plates [317] having dual concavity sections [318] that when joined form ingresses [416,417] (shown in FIG. 4) that can be used for additional portals for data collection and monitoring. A gasket [319] or other suitable sealing means is fitted within the lip [323] of the lipped recess [322] of the upper planar portion [321] to provide additional environmental isolation between the environment and enclosed space(s) defined when the instrument enclosure [100] is in a closed configuration. The outward edges of the ingresses [416,417] of FIG. 4 are sealed with a transparent or translucent glass or plastic lens [418], that can be planar, convex, concave or otherwise shaped for optimization of the field instrument(s) [110] enclosed within the instrument enclosure [100].

In further embodiments, the lenses [418] can be made of any suitable material or combination of materials that allows for optimal function and data collection of the field instrument(s) [110] within the instrument enclosure [100].

The top casing [601] and complete bottom casing [602, which is consists of 312, 313, 401, 402] illustrated in FIG. 6, are substantially triangular in cross section as best illustrated by the substantially triangular side panel [611] of top casing [601] and the substantially triangular side panels [612] of bottom casing [602]. A front panel [613] of top casing [601] is illustrated with an optional window [645] to enable visual inspection of the instrument enclosure [100] without opening the instrument enclosure [100]. A window [645] may be comprised of tempered glass or any other sufficiently transparent and durable material.

As best illustrated in FIG. 6, the instrument enclosure [100] is in an open position, with a top section casing [601] that includes first, second, third, and fourth edges [641-1, 642-1, 643-1, and 644-1]. Similarly, a bottom section casing [602] includes first, second, third, and fourth edges [641-2, 642-2, 643-2, and 644-2]. The first edge [641-2] of the bottom casing [602] may be hinged or otherwise rotatably-affixed to the first edge [641-1] of the top casing [601] via one or more hinges [403] or other suitable attachment means, in which second, third, and fourth edges [642-1, 643-1, and 644-1], of top casing [601] are in contact with or in close proximity to second, third, and fourth edges [642-2, 643-2 and 644-2] of the bottom casing [602].

Although the figures illustrate hinging between the top casing [601] sections and the bottom casing [602] sections along first edges [641] of the top casing [601] sections and the bottom casing [602] sections, embodiments of the instrument enclosure [100] may include additional hinging between top casing [601] and bottom casing [602] sections to provide variations of open and closed configurations of instrument enclosures [100] in addition to the open and closed configurations supported by the illustrated hinging. Such additional hinging may include, without limitation, fixed or detachable hinging between second edges [642], fixed or detach hinging between third edges [643], and fixed or detachable hinging between fourth edges [644].

In the closed position, the top casing [601] and bottom casing [602] cooperatively define an instrument enclosure space within which a field instrument [110] may be located as described in more detail below. In at least some embodiments, top casing [601] and bottom casing [602] sections cooperatively form a cubic or substantially cubic instrument enclosure [100]. In at least some other embodiments, the top casing [601] and bottom casing [602] sections cooperatively form a rectangular cuboid or substantially rectangular cuboid instrument enclosure [100].

The left and right bottom base sections [312,313] illustrated in FIG. 3-FIG. 6 further include or define notches [315], configured to engage tubing [433] and provide for enclosing power wires [436], and notches [315], configured to engage tubing [434] that also encloses communication wires or fibers [437]. The upper planar portions [321] define corresponding notches [315] configured to engage process line tubing [111,112] such that the lower and upper planar portions [320,321] may be connected to each other while engaging process line tubing [111,112], allowing for process line tubing [111,112] to enter the instrument enclosure [100]. While the notches [315] are illustrated in FIG. 3 as smooth and continuous arcs, embodiments may incorporate grooves and/or other elements to better restrict or engage the applicable pipes, tubing, or other structural elements.

Gaskets or other type of sealing structures (not depicted) may be employed to provide additional environmental isolation between the environment and enclosed space defined when the instrument enclosure is closed.

The illustrated instrument enclosure [100] is configured for independent attachment to the support and includes three mutually adjustable parts—top casing [601] section, left bottom casing segment [401], and right bottom casing segment [402], that provide structure for removing and replacing the instrument enclosure [100] for a field instrument [110] attached to the process line tubing [111,112] without detaching the field instrument [110] from the standpipe [104] or other support structure or from the process line tubing [111,112].

In a similar embodiment, the mounting plate assembly [203, not shown] may include a field instrument column [667] as shown in FIG. 6 that extends from a mounting plate [203, not shown] and further fitted with the left and right bottom casing segments [312,313]. In such assemblies, even though field instrument column [667] occupies volume analogous to the volume occupied by standpipe [104] shown in FIG. 1 through FIG. 5, the mounting plate embodiment illustrated in FIG. 6 enables a beneficial pre-field attachment of the field instrument [110] to the field instrument column [667], i.e., attachment of the instrument to the enclosure before the field instrument [110] is brought to the field, thereby greatly easing the burden experienced during installation. In other mounting plate embodiments, the field instrument may be attached directly to the mounting plate [203] thereby achieving the pre-field attachment feature described above for the embodiment depicted in FIG. 7, but also potentially enabling an instrument enclosure with a smaller footprint, an instrument enclosure with more interior space, or both.

Supporting the field instrument may include one or more operations including: attaching the field instrument to the standing structure, wherein the instrument enclosure defines an aperture configured to receive a terminal portion the standing structure and attaching the field instrument to one or more attachment features of the instrument enclosure.

We claim:

1. One or more instrument enclosures, comprising: a top section casing with a first, second, third, and fourth edge and a bottom section casing with a first, second, third, and fourth edge, wherein said first edge of said bottom section casing is hinged and/or rotatably-affixed to said first edge of said top section casing via one or more hinges and wherein second, third, and fourth edges of said top casing section are in contact with or in close proximity to said second, third, and fourth edges of said bottom section casing that provides a housing that encloses at least a portion of said instrument enclosures such that one or more instruments within said enclosures is rotatable and wherein one or more hinges are configured to enable both said top section casing and said bottom section casing to rotate between a closed position and one or more open positions and wherein:
    a first portion of said bottom section casing defines a first pipe notch and a first line notch;
    and a second portion of said bottom section casing defines a second pipe notch and a second line notch such that said first pipe notch and said second pipe notch are configured to define a standpipe opening in said bottom section casing such that said standpipe opening is configured to engage a standpipe; and wherein said first line notch and said second line notch are configured to define a process line opening in said bottom section casing;
    wherein said process line opening is configured to receive process line tubing enclosing one or more process line signals conveying one or more process line parameters to said one or more field instruments.

2. The instrument enclosures of claim 1, wherein hinges between said top section casing and said bottom section casing along first edges of said top section casing and said bottom section casing includes additional hinging between top casing and bottom casing sections that provides multiple variations of open and closed configurations of said instrument enclosures wherein said additional hinging includes fixed and/or detachable hinging between any of second, third and fourth edges.

3. The instrument enclosures of claim 2, wherein a first part of said bottom section casing possesses a first notch; a second part of said bottom section casing possesses a second notch; and wherein said first notch and said second notch are configured to define an opening in said bottom section casing.

4. The instrument enclosures of claim 3, wherein said standpipe is attached to said bottom section casing and/or resides within an instrument enclosure.

5. The instrument enclosures of claim 4, wherein:
    one or more interior surfaces of said bottom section casing includes one or more instrument attachment elements that allow for attachment to, removal of, and/or rotation for a field instrument to said bottom section casing; and
    wherein said enclosed space exists to receive one or more field instruments removably attached to said bottom section casing.

6. The instrument enclosures of claim 4, wherein an opening in said bottom section casing is configured to receive one or more process line conduits that convey one or more measurable process parameters to said one or more field instruments.

7. The instrument enclosures of claim 1, wherein: said bottom section casing is configured to be fastened to a bracket affixed to said standpipe wherein said bracket includes a plurality of openings suitable for receiving fasteners; and wherein said bottom section casing includes a plurality of openings corresponding to said plurality of openings in said bracket.

8. The instrument enclosures of claim 1, wherein, said instrument enclosures comprise a convex polyhedral instrument enclosure.

9. The instrument enclosures of claim 8, wherein said convex polyhedral instrument enclosures comprise a hexahedral instrument enclosure comprising six planar surfaces including an upper surface, a lower surface, a forward surface, a rearward surface, a left surface, and a right surface.

10. The instrument enclosures of claim 9, wherein:
    said top section casing includes an upper surface, a forward surface, a first portion of a left surface, and a first portion of a right surface; and said bottom section casing includes a lower surface, a rearward surface, a second portion of a left surface, and a second portion of a right surface.

11. The instrument enclosures of claim 9, wherein said first part of said bottom section casing includes a first portion of the lower surface, a first portion of the rearward surface, and the second portion of the left surface; and a second part of said bottom section casing includes a second portion of said lower surface, a second portion of said rearward surface, and a second portion of said right surface.

12. The instrument enclosures of claim 11, wherein said first portion of said lower surface comprises a first half portion of said lower surface; said second portion of said lower surface comprises a second half portion of said lower surface said first portion of said rearward surface comprises a first half or said rearward surface and said second portion of said rearward surface comprises a second half of said rearward surface.

13. The instrument enclosures of claim 12, wherein at least one planar surface of said instrument enclosures contains one or more windows that are transparent and exhibit durability that minimize or eliminate breakage of said windows.

14. The windows of claim 13, wherein said windows are composed of tempered glass.

15. A method of providing one or more instrument enclosures that enclose and protect one or more field instruments at a desired location, the method comprising:
    hinging a hinged section of an instrument enclosure to a vertical support section that is self-standing and/or secured to stand vertically, including a standpipe, located in said desired location wherein said hinging enables said hinged section to rotate relative to said vertical support section between a closed position and one or more open positions of said instrument enclosures such that one or more instruments mounted within said one or more instrument enclosures are also capable of rotation or other position adjustments and wherein a combination of said vertical support section and said hinged section, in a closed position defines an enclosed space that is dimensioned to receive said one or more field instruments and wherein said one or more instrument enclosures are constructed in order to provide a protective barrier between an enclosed space and an external environment wherein said instrument enclosures are located such that said protective barrier shields provide said enclosed space from one or more environmental elements;

and;

affixing said one or more field instruments to one or more supporting structures wherein said field instruments are disposed in a desired, particular position within said enclosed space such that said instrument enclosure is attached to said vertical support section wherein said hinged section is hinged to said vertical support section and said field instruments are enclosed within a closed portion of said instrument enclosures such that a first portion of said bottom section casing defines a first pipe notch and a first line notch; and a second portion of said bottom section casing defines a second pipe notch and a second line notch such that said first pipe notch and said second pipe notch are configured to define a standpipe opening in said bottom section casing such that said standpipe opening is configured to engage said standpipe; and wherein said first line notch and said second line notch are configured to define a process line opening in said bottom section casing; wherein said process line opening is configured to receive process line tubing enclosing one or more process line signals conveying one or more process line parameters to said one or more field instruments.

16. The method of claim 15, wherein a sequence of performing, hinging, attaching, and supporting includes a sequence selected from the group consisting of:

hinging, attaching, and supporting; attaching, hinging, and supporting; supporting, hinging, and attaching; and supporting, attaching, and hinging.

17. The method of claim 16, further comprising: forming said fixed section by fastening a first part of said hinged section to a second part of said hinged section.

18. The method of claim 17, wherein supporting field instruments comprise performing an operation to provide support from the group consisting of:

attaching said field instruments to said vertical support structure, wherein said instrument enclosure defines an aperture configured to receive a terminal portion of said vertical support structure; allowing for rotation and/or other positioning of said field instruments within said instrument enclosures and attaching said field instruments to one or more attachment features of said instrument enclosure.

* * * * *